(12) United States Patent
Lee et al.

(10) Patent No.: US 12,705,890 B2
(45) Date of Patent: Aug. 11, 2026

(54) MEMORY-BASED VIDEO OBJECT SEGMENTATION

(71) Applicant: Adobe Inc., San Jose, CA (US)

(72) Inventors: Joon-Young Lee, San Jose, CA (US); Seoung Wug Oh, San Jose, CA (US); John G. Nelson, Normandy Park, WA (US); Wujun Wang, Mercer Island, WA (US)

(73) Assignee: Adobe Inc., San Jose, CA (US)

( * ) Notice: Subject to any disclaimer, the term of this patent is extended or adjusted under 35 U.S.C. 154(b) by 345 days.

(21) Appl. No.: 18/361,707

(22) Filed: Jul. 28, 2023

(65) Prior Publication Data

US 2025/0037461 A1 Jan. 30, 2025

(51) Int. Cl.
*G06V 20/40* (2022.01)
*G06V 10/72* (2022.01)

(52) U.S. Cl.
CPC .............. *G06V 20/41* (2022.01); *G06V 10/72* (2022.01)

(58) Field of Classification Search
CPC ........ G06V 20/41; G06V 10/72; G06V 10/82; G06T 2207/20084; G06T 2207/10016; G06T 2207/20081; G06T 7/11; G06N 3/045; G06N 3/08
See application file for complete search history.

(56) References Cited

U.S. PATENT DOCUMENTS

2010/0128168 A1* 5/2010 Zhen ...................... H04N 19/86 348/420.1
2017/0372479 A1* 12/2017 Somanath ................. G06T 7/11
2019/0095745 A1* 3/2019 Bao .......................... G06T 7/246
2020/0117906 A1* 4/2020 Lee ....................... G06V 10/764
2024/0397059 A1* 11/2024 Lee ........................ G06V 10/82

FOREIGN PATENT DOCUMENTS

CN 108268869 B * 11/2021 ............. G06N 3/045
CN 113807322 A * 12/2021 ............. G06N 3/045
WO WO-2022270153 A1 * 12/2022 ........... A61B 8/5207

* cited by examiner

*Primary Examiner* — John Villecco
*Assistant Examiner* — Kyla Guan-Ping Tiao Allen
(74) *Attorney, Agent, or Firm* — Nicholson De Vos Webster & Elliott LLP

(57) ABSTRACT

Embodiments are disclosed for a method including obtaining a region of interest of a current frame of a video sequence depicting an object. The method may further include determining, by a mask propagation model, a likelihood of each pixel of the current frame being associated with the object in the region of interest of the current frame based on the region of interest of the current frame and a fixed number of previous frames of the video sequence including the object. The method may further include replacing a previous frame of the fixed number of previous frames with the current frame. The method may further include displaying the current frame of the video sequence including a masked object in the region of interest of the current frame based on the likelihood of one or more pixels of the current frame being associated with the object.

20 Claims, 9 Drawing Sheets

500

SEGMENTATION SYSTEM 100

PAST MASK MEMORY
124

FRAME AT
TIME T=3

INITIAL
MASK

MASKED
FRAME AT
TIME T=3

MASKED
FRAME AT
TIME T=2

INDEX 1

INDEX 2

INDEX 3

MEMORY MODULE 108

800

MEMORY-BASED VIDEO OBJECT SEGMENTATION

BACKGROUND

Segmentation is a technique used to classify pixels in an image as belonging to a particular object. In this manner, particular objects of an image are delineated from other objects of the image. The segmented objects can be displayed as masked objects in a frame of a video. Video segmentation segments objects throughout a video. That is, the segmented objects are propagated through each frame of the multiple frames included in a video to mask objects in the video.

SUMMARY

Introduced here are techniques/technologies that perform video object segmentation to mask one or more objects across multiple frames of a video. The segmentation system described herein uses a modified memory-based video object segmentation machine learning model to segment one or more objects in an image in a computationally efficient manner. The segmentation system described herein can be deployed in limited computing resource environments such as mobile phones, desktops, laptops, and/or other computing devices. The segmentation system identifies objects to segment using a limited memory representation of objects segmented in previous frames.

More specifically, in one or more embodiments, the segmentation system segments an object in a region of a frame of a video using one or more representations of previous regions of frames including the object. The region of the frame is processed by a modified memory-based video object segmentation machine learning model. The modified memory-based video object segmentation machine learning model classifies each pixel of the region of the frame as belonging to the object or not, where pixels belonging to the object are masked to create a masked object in the region of a frame. For example, the memory-based video object segmentation machine learning model may be the XMem machine learning model. The XMem machine learning model is modified by removing long term memory storage and rescaling the likelihood of each pixel being identified as belonging to the object. The segmentation system then stitches the masked object in the region of the frame to the remaining portion of the frame to create a masked frame understandable by humans. The resulting masked frames are temporally coherent because the same objects appearing in multiple frames over time are masked consistently.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
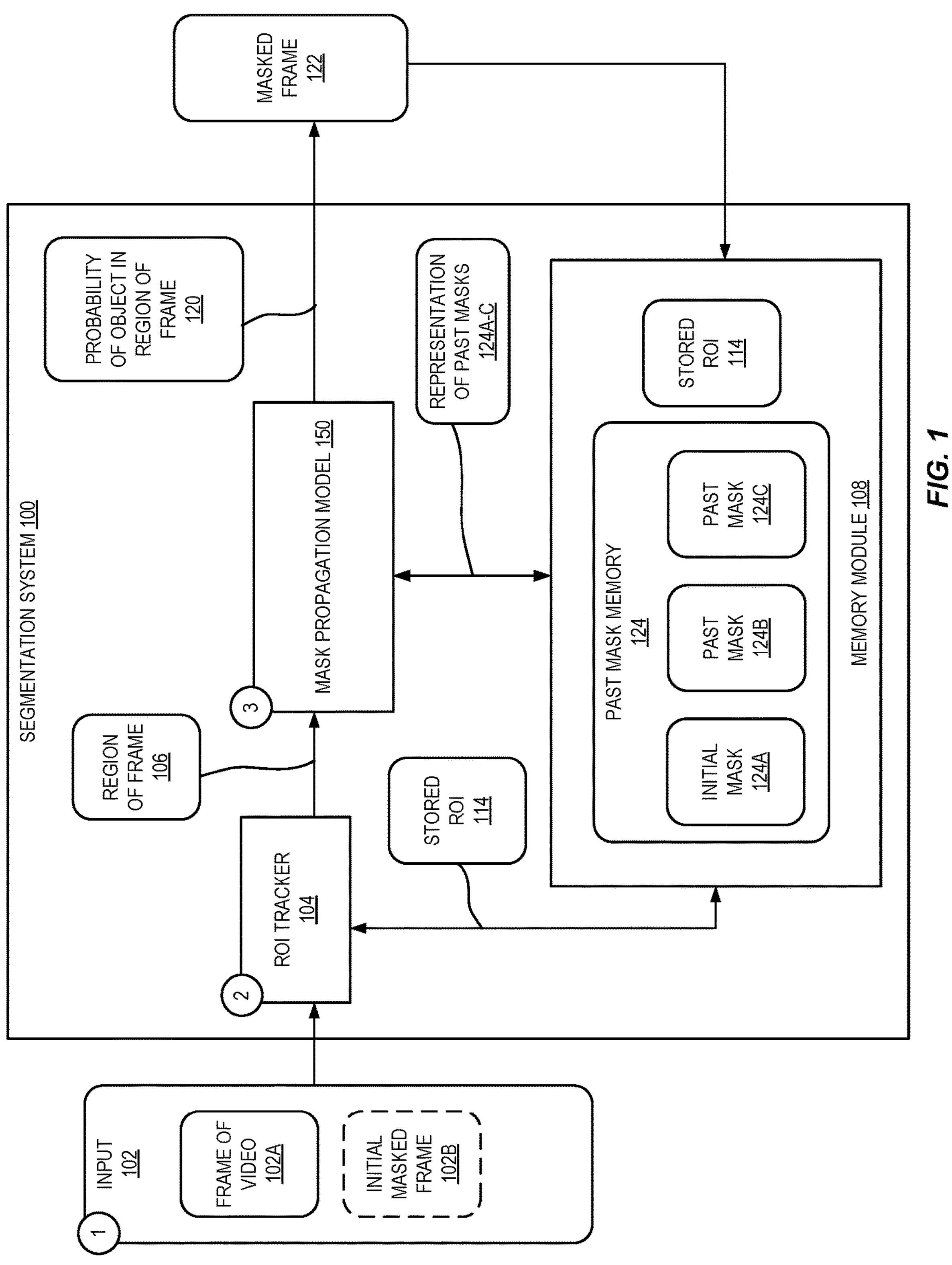
FIG. 1 illustrates a diagram of a process of segmenting an object in a frame, in accordance with one or more embodiments.

One or more embodiments of the present disclosure include a segmentation system used to perform memory-based video object segmentation. Memory-based video object segmentation approaches segment objects across frames of a video by temporally propagating stored mask segments. Specifically, conventional memory-based video object segmentation approaches employ dynamic memory that increase the number of frames stored in memory each time the memory-based video object segmentation model receives a new frame. In such conventional approaches, over time, the size of memory increases to accommodate an increase in the number of stored frames. However, these approaches consume significant memory and other computing resources when the size of the video sequence is large (e.g., the memory storing the number of previous frames grows to accommodate the number of frames of the video sequence).

Some conventional approaches conserve computing resources by fixing the resolution of the frame input to the memory-based video object segmentation machine learning model and the frame output by the memory-based video object segmentation machine learning model. For example, conventional systems resize a pixel resolution of a received frame (e.g., down sample) to a predetermined processing resolution, perform processing using the processing resolution, and subsequently resize the output frame (e.g., up sample) to the received pixel resolution. By fixing the processing resolution of the machine learning model, the dimensions of the model metrics are fixed. For example, matrix multiplication, memory size, and/or other variable dimensions of the machine learning model are fixed. However, these approaches lose information such as spatial information stored in each frame when the frame is resized to the predetermined processing resolution.

To address these and other deficiencies in conventional systems, the segmentation system of the present disclosure employs a modified memory-based video object segmentation machine learning model to conserve computing resources such as memory. The systems and processes described herein enable deployment of a memory-based video object segmentation machine learning model that leverages static computational graph systems, where a static computational graph system is a system that performs the same (e.g., static) computations. Static computational graph systems are different from dynamic computational graph systems where dynamic computational graph systems dynamically adjust the computations based on a time (e.g., a duration of time the dynamic computation graph system is deployed, a number of iterations, etc.), a received input resolution, a preferred output resolution, current systems resources (e.g., where the computations performed depend on the available resources), and the like.

Usually, there is a tradeoff between computational resources (e.g., a size of memory used to store frames of the video sequence) and accuracy. For example, by pre-allocating the memory used to store frames of a video sequence (e.g., in static computational graph systems), the predicted likelihood of a pixel of the frame belonging to the object to be segmented degrades over time. The masked frame, determined by the machine learning model classifying pixels as belonging to an object to be segmented based on pixels belonging to the object in previous frames, performs less accurately because there are fewer previous frames used to classify whether the pixels belong to the object to be segmented. For example, by limiting the memory storing the number of intermediate frames of the video sequence (e.g., in static computational graph systems), the machine learning model segments objects using a limited memory of the object in previous frames. Such a limited memory of the previous frames can introduce errors such as, for instance, when the previous frame is blurry, the object in the previous frame is obstructed, and the like.

To address these and other deficiencies, the segmentation system of the present disclosure selects only certain frames to be replaced in a pre-allocated memory based on a reliability of each frame. Storing certain frames in the pre-allocated memory enables the deployment of a static computational system which conserves computing resources that would otherwise be necessary when performing memory-based video object segmentation using dynamic computational systems (e.g., dynamically growing memory). Additionally, the segmentation system of the present disclosure rescales the predicted likelihood of the pixel of the frame belonging to the object to increase the confidence of the modified machine learning model in masking the object.

Furthermore, the segmentation system of the present disclosure implements a simplified region-of-interest (ROI) tracking algorithm. The simplified ROI tracking algorithm identifies the ROI of a frame to be processed by the machine learning model. Accordingly, instead of conserving computing resources by resizing the entire frame to a fixed processing resolution and therefore losing information in the frame, as is performed in conventional systems, the segmentation system of the present disclosure conserves computing resources by processing only the ROI associated with relevant object(s) in the frame to retain spatial information (and other information) associated with the object.

FIG. 1 illustrates a diagram of a process of segmenting an object in a frame, in accordance with one or more embodiments. The segmentation system 100 segments an object of each frame using memory of the segmented objects in previous frames of the video sequence. The segmentation system 100 can be implemented as a standalone system and/or incorporated as part of a larger system or application. The object, once segmented by the segmentation system 100, is masked to create a masked frame including the object. As described herein, an object of the frame is a representation of an object depicted in/by the frame.

At numeral 1, the segmentation system 100 receives input 102A and/or input 102B. Input 102A is a frame of a video sequence (e.g., a computer-generated video, a video captured by a video recorder (or other sensor), and the like) of any digital visual media including a plurality of frames, which, when played, include a moving visual representation of a story and/or an event. Each frame of the video is an instantaneous image of the video at a time t. The input 102A is a current frame being processed by the segmentation system 100. After processing by the segmentation system 100, the input frame 102A (e.g., a current frame at time t) results in a corresponding masked frame 122 at time t. That is, an object is segmented by the segmentation system 100, resulting in masked frame 122 including a masked object. The masked frame 122 associated with the frame at time t may be stored in past mask memory 124 for use during processing of an input frame at a time t+1 (not shown).

Input 102B is an initial masked frame including one or more masked objects. The masked object(s) in the initial masked frame represent an object in the video to be segmented. In some embodiments, a user selects the object to be segmented. In other embodiments, the object to be segmented is selected by one or more upstream processes.

In some embodiments, a third-party system or other upstream process receives a selected object in a frame and subsequently masks the selected object to create an initial masked frame. In some embodiments, the segmentation system 100 determines the initial masked frame at a first time period (e.g., t=0) by segmenting a selected object before any masks are stored in past mask memory 124. For example, one or more modules of the segmentation system 100 detect a selected object in a frame of a video using any object detection and/or object recognition algorithm. Specifically, one or more modules of the segmentation system 100 perform image segmentation to segment objects of a frame. For example, the segmentation system 100 may include a convolutional neural network (CNN) or other type of neural network to segment objects of the frame.

A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

In some embodiments, the initial masked frame is received by the segmentation system 100 along with the frame of the video at a first time period (e.g., t=0). As described with reference to FIG. 5, the initial masked frame is stored in past mask memory 124. In some embodiments, at each time period after the first time period (e.g., t=1, 2, . . . ) the segmentation system 100 only receives the frame of the video (e.g., input frame 102A) and uses the initial masked frame stored in past mask memory 124 (e.g., initial mask 124A).

At numeral 2, the ROI tracker 104 queries a memory module 108 for stored ROI 114. The memory module 108 stores a ROI associated with a previously masked frame (e.g., stored ROI 114), past masks 124 including feature representations of the previously masked frames (e.g., initial mask 124A, past mask 124B, past mask 124C, and the like), previously masked frames, and/or some combination.

The ROI tracker 104 applies the stored ROI 114 to input frame 102A (e.g., a frame of video at time t of the video sequence). The stored ROI 114 identifies a region of the current frame (e.g., a frame of the video at time t) that likely includes the object to be segmented. As described herein, the stored ROI 114 is based on a region of interest associated with a masked object of a previous masked frame (e.g., masked frame 122 at time t−1). By applying the stored ROI 114 to the input frame 102A, the ROI tracker 104 tracks a region of the input frame 102A that likely includes the object to be segmented based on the location of the masked object (e.g., the segmented object of a previous frame) in a previous frame. As described above, in the specific instance of time t=0, the ROI tracker 104 may not apply a stored ROI 114 to an input 102 because there is no previous frame to determine a ROI to be stored as the stored ROI 114. In these embodiments, even though the ROI tracker 104 may not crop the input 102 (where, at time t=0 input 102 is the initial masked frame 102B), the ROI tracker 104 can resize the initial masked frame 102B to a processing resolution, as described below. Determining the stored ROI 114 is described with reference to FIG. 3.

When the ROI tracker 104 applies the stored ROI 114 to input frame 102A, the size of the input frame 102A shrinks to the size of the stored ROI 114. For example, the ROI tracker 104 crops the input frame 102A to obtain region of frame 106. Accordingly, instead of providing the mask propagation model 150 with the frame at time t, the mask propagation model 150 is provided with a region of the frame at time t (e.g., region of frame 106). The region of the frame 106 is based on the size of the stored ROI 114. Processing the region of the frame 106 instead of the entire input frame 102A effectively increases the processing resolution without increasing the size of dimensions typically associated with an increased processing resolution. In some embodiments, the ROI tracker 104 converts the region of the frame 106 at a resolution (X,Y) into a processing resolution (e.g., resolution (X',Y')). The mask propagation model 150 processes the region of the frame 106 at the processing resolution. Specifically, the mask propagation model 150 receives the region of the frame 106 at processing resolution (X',Y') and is used to return a masked region of the frame at the processing resolution (X',Y'). For ease of description, the mask propagation model 150 is described as receiving a region of the frame 106. However, it should be appreciated that the region of the frame 106 may be the region of the frame at the processing resolution (X',Y'). As described herein (with respect to the mask compiler 302 of FIG. 3), the masked region of the frame is converted back to the resolution of the stored ROI 114 the input frame 102A (e.g., the resolution (X,Y)).

In some embodiments, the memory module 108 stores masks, as described herein, at a processing resolution. For example, if the processing resolution is (X',Y'), the masks stored in past mask memory 124 (e.g., initial mask 124A, past mask 124B, and past mask 124C) are each stored according to the processing resolution (X',Y').

At numeral 3, the mask propagation model 150 receives the region of the frame 106 from the ROI tracker 104. The mask propagation model 150 also queries the memory module 108 for representations of past masks 124A-C. As described with reference to FIG. 2, the memory module 108 stores initial mask 124, past mask 124B, and past mask 124C (collectively referred to herein as "past masks 124") in past mask memory 124 and converts such past masks 124 into representations of past masks 124A-C for use by the mask propagation model 150. As described herein, a representation of a past mask includes a feature map of a previously masked frame. While the past mask memory 124 is illustrated as storing three masks: initial mask 124A, past mask 124B, and past mask 124C, it should be appreciated that the past mask memory 124 can be configured to store any fixed number of mask memory.

The mask propagation model 150 temporally associates the region of the frame 106 with the representation of past masks 124A-C using any memory-based video object segmentation model. Specifically, the mask propagation model 150 performs pixel-level tracking to track the temporal coherence of object motion across frames. In other words, the mask propagation model 150 tracks segmented objects of each frame using memory of segmented objects in previous frames. In some embodiments, the mask propagation model 150 is a modified XMem machine learning model. The modified XMem model temporally propagates masks of objects by encoding structural spatial information of objects in a frame. The modified XMem model uses limited storage of representations of previously masked frames to identify when objects move (or don't move) across a series of frames over time.

As shown, the mask propagation model 150 determines a probability (e.g., a likelihood) of the object in the region of the frame 120. Such a probability is used to determine masked frame 122. For example, the probability of the object in the region of the frame 120 may be a probability distribution of each pixel in the region belonging to the object. In an example, a pixel that likely belongs to the object receives a high likelihood (e.g., a value of 1), and a pixel that likely does not belong to the object receives a low likelihood (e.g., a value of 0). As described with reference to FIG. 3, the probability of one or more pixels belonging to the object in the region of the frame is converted into masked frame 122. The masked frame 122 is a frame visually understandable by humans that differentiates the segmented object by masking the segmented object in a way that visually differentiates the object from one or more other objects in the frame. The masked frame 122 may be stored in past mask memory 124 by replacing a stored previously masked frame. Additionally, the masked frame 122 is used to update the stored ROI 114 based on the location of the masked object in the masked frame 122.

Figure 2:
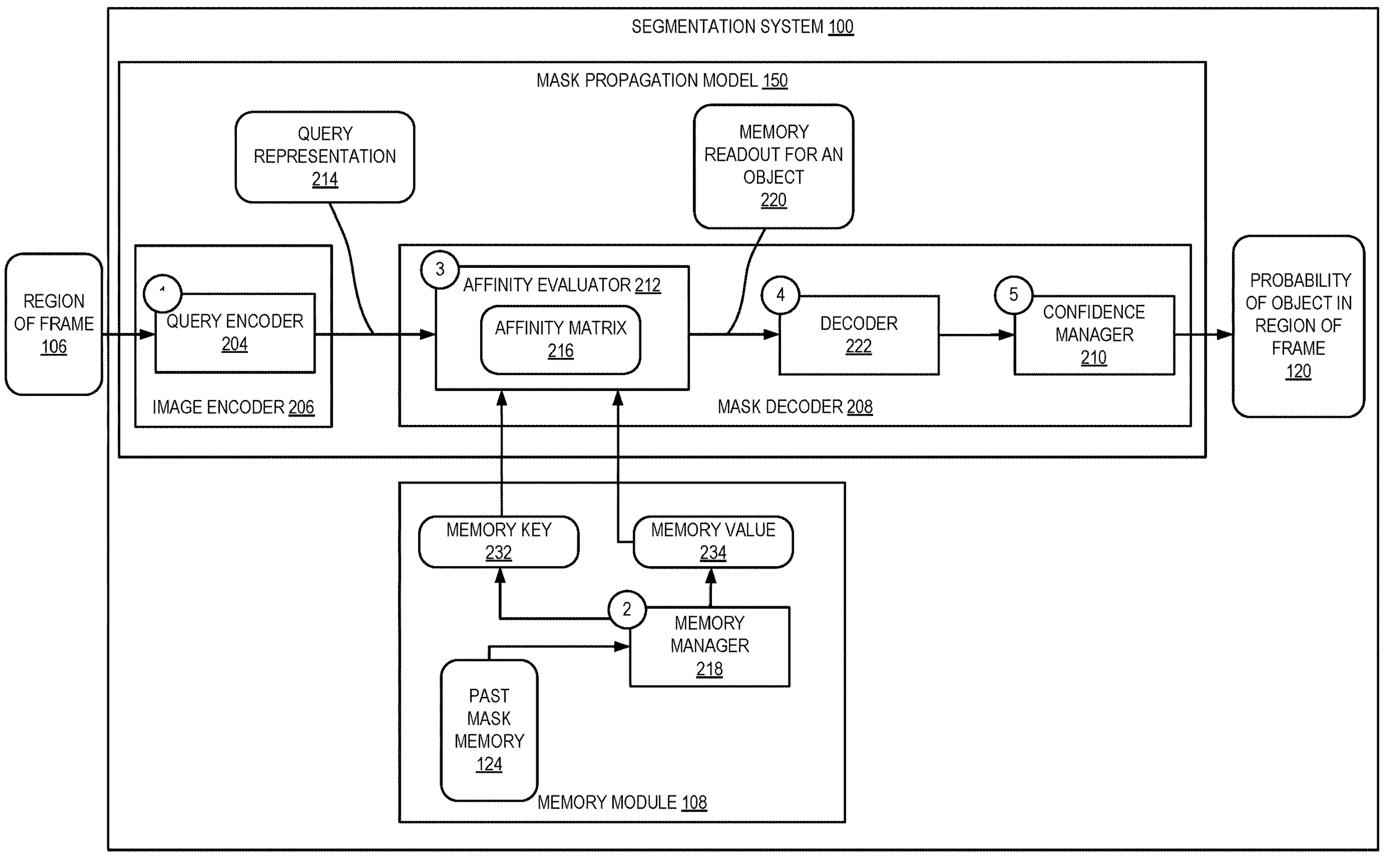
FIG. 2 illustrates a diagram of a process of the mask propagation model, in accordance with one or more embodiments.

FIG. 2 illustrates a diagram of a process of the mask propagation model, in accordance with one or more embodiments. As shown in FIG. 2, the mask propagation model 150 includes an image encoder 206 and a mask decoder 208. The image encoder 206 transforms a region of the frame 106 (e.g., a region of an image) into a latent space representation of the region of the frame. The latent space representation is a space in which unobserved features are determined such that relationships and other dependencies of such features can be learned. The latent space representation may be a feature map (otherwise referred to herein as a feature vector) of extracted properties/characteristics of the region of the frame 106. The mask decoder 208 decompresses or otherwise reconstructs the encoded region of the frame using the latent space representation of the portion of the frame.

At numeral 1, the query encoder 204 of the image encoder 206 tokenizes the region of the frame 106 by dividing the region of the frame 106 into tokens, each token mapped to a grid of pixels of the region of the frame 106. The tokens, representing a grid of pixels of a predetermined dimension, become a query. The query encoder 204 determines a query representation 214 (e.g., a latent space representation of the query) using a feature extractor (such as a CNN) or other encoder. The query encoder 204 then passes the query representation 214 to the affinity evaluator 212 of the mask decoder 208.

At numeral 2, the memory manager 218 determines a memory key 232 and a memory value 234 using past masks stored in the past mask memory 124. Storing masks in the past mask memory 124 is described in FIGS. 5-6 below. The memory key 232 and the memory value 234 encode structural spatial information of the past masks 124 such as information about each object in the frame. Specifically, the memory key 232 encodes a representation of visual information of the past masks 124 for accurate memory readout, and the memory value 234 encodes detailed information like mask probabilities along with corresponding visual information of the past masks 124 for accurate mask decoding. As described herein, the mask probabilities include the likelihood of each pixel of the region of the frame 106 belonging to the object. The memory key 232 at a particular local region is the same across different objects in an image, and the memory value 234 is determined for a particular object. Both the memory key 232 and the memory value 234 capture object information of previous frames in the video sequence.

To create the memory key 232 and memory value 234, the memory manager 218 tokenizes the pasts masks 124 by dividing the past masks 124 into tokens including grids of pixels. Subsequently, feature maps are determined (using a CNN for instance) of each token of the memory key 232 and memory value 234. The memory manager 118 encodes grids that include objects using any suitable mechanism such as one-hot encoding.

At numeral 3, the affinity evaluator 212 creates an affinity matrix 216 by comparing every token of the query representation 214 to the memory key 232 using matrix multiplication. The affinity matrix 216 transfers knowledge from the memory (e.g., the masked objects of the past masks 124) to the region of the frame 106 by identifying whether every pixel in the region of the frame 106 is similar to any pixel in past frames 124 of masked objects. For example, an element of the affinity matrix 216 may be high if a pixel (or a grid of pixels) represented by the element of the affinity matrix 216 is similar in both the frame and one or more past frames.

Also at numeral 3, the affinity evaluator 212 identifies specific objects of the past masks 112. Specifically, the affinity evaluator 212 applies the memory value 134 to the affinity matrix 216. In this manner, memory readouts 220 for one or more objects of the past masks 124 are determined. The memory readout 220 is a representation of each object that is likely present in the current frame.

At numeral 4, the decoder 222 receives the feature map of the memory readout corresponding to the selected object (e.g., the object associated with the masked object in the initial mask). The decoder 222 converts the feature map into a probability of each pixel belonging to the object in the region of the frame. For example, the decoder 222 determines a probability distribution of each pixel belonging to the object.

At numeral 5, the confidence manager 210 rescales the probability distribution of each pixel belonging to the object, binarizing the predicted likelihood that one or more pixels are associated with the object. As described herein, reducing the memory used to segment the object in the frame degrades the accuracy of the predicted segmented object (e.g., the masked object) in the frame and/or disperses the memory reading, increasing the uncertainty of the predicted segmented object over time. To counter the uncertainty of the probability of each pixel belonging to the object in the region of the frame, the confidence manager 210 rescales the pixel probabilities toward the binary (e.g., 0 or 1). In one embodiment, the confidence manager 210 rescales the probability according to Equation (1) below:

$$\text{Rescaled Probability } P = \frac{1}{1 + e^{(-R*(\text{probability of each pixel}-0.5))}} \quad (1)$$

The variable R in Equation (1) is a tunable hyperparameter which, in some embodiments is 9. As a result of the rescaling, the confidence manager 210 determines a rescaled probability of each pixel belonging to the object in the region of the frame 120. As shown, the confidence manager 210 is its own component. In some embodiments, the operations performed by the confidence manager 210 are performed by the decoder 222. In other embodiments, the operations performed by the confidence manager 210 are not executed such that the probability of each pixel belonging to the object in the region of the frame is not rescaled.

Figure 3:
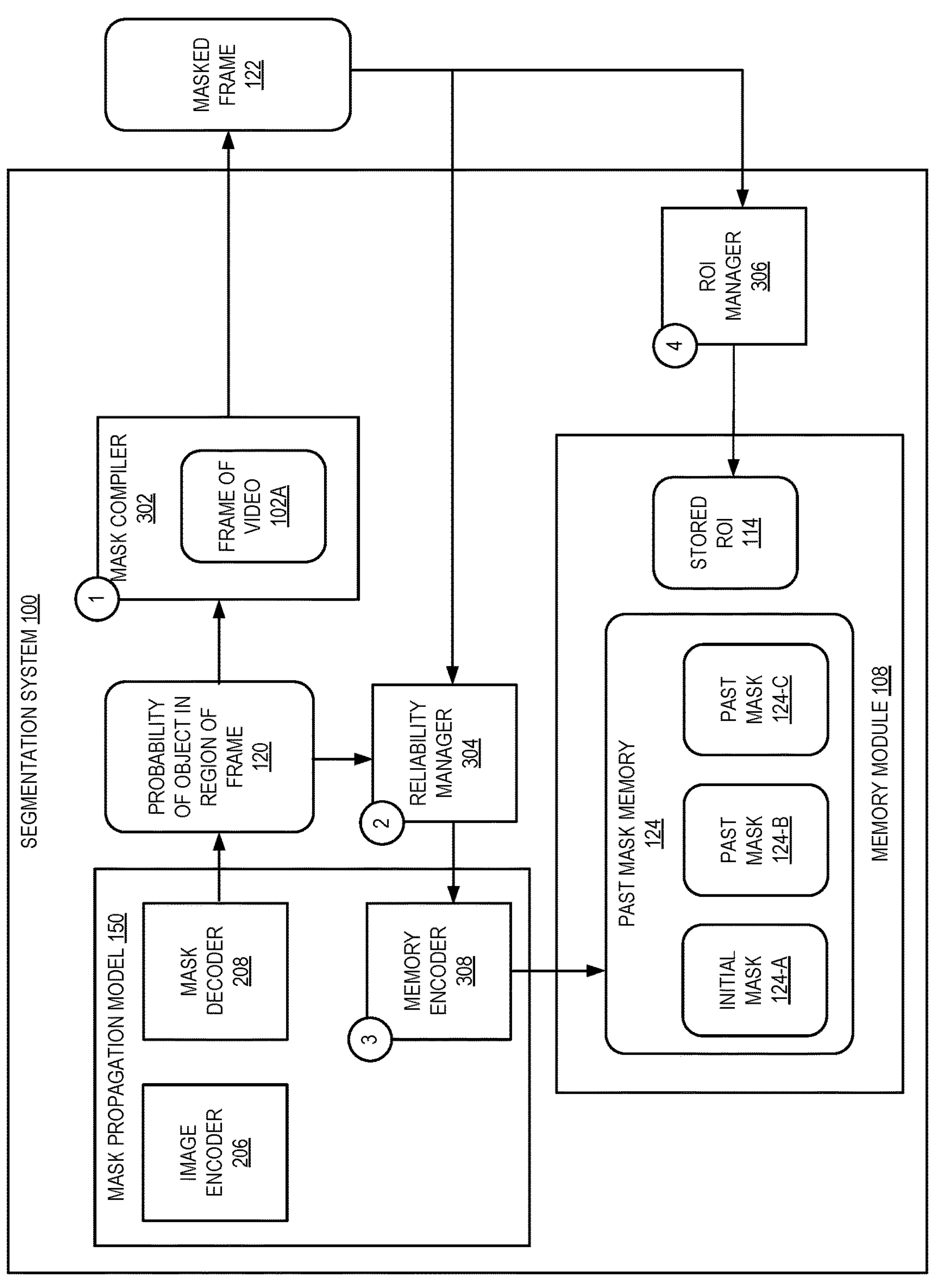
FIG. 3 illustrates a diagram of a process of selecting masked frames to be stored in past mask memory, in accordance with one or more embodiments.

FIG. 3 illustrates a diagram of a process of selecting masked frames to be stored in past mask memory, in accordance with one or more embodiments. At numeral 1, a mask compiler 302 receives the probability of each pixel belonging to the object in the region of the frame 120. The mask compiler 302 converts the numerical representation of the region of the frame (e.g., a probability distribution, a binarized probability distribution, etc.) into a visual representation of the region of the frame. For example, pixels set to a value of "0" correspond to a low probability of a pixel belonging to an object while pixels set to a value of "1" correspond to a high probability of a pixel belonging to an object. The mask compiler 302 overlaps one or more visual indicators over the segmented object of the region of the frame to mask an object in the region of the frame. Such overlayed visual indicators may be colors, patterns, and the like, displayed to the user. The masked frame 122 masks an object of the region of the frame.

In some embodiments, the mask compiler 302 stitches the masked object in the region of the frame with the remaining portion of the frame using the input frame 102A. As described herein, the mask propagation model 150 receives the region of the frame (e.g., a cropped portion of the frame at a processing resolution of (X',Y'), for instance). As described above, the mask propagation model 150 returns the probability of the object being in the region of the frame 120 at the processing resolution of (X',Y'), and the mask compiler 312 converts the numerical representation into a visual representation of the region of the frame. The visual representation of the region of the frame is still at the processing resolution (X',Y'). The visual representation of the region of the frame is a region of the frame with a masked object, based on the probability of each pixel belonging to the object. Subsequently, the mask compiler 102 converts the resolution of the visual representation of the region of the frame to the resolution of the input frame 102A and/or the stored ROI 114. For example, the resolution of the visual representation of the region of the frame is converted from a processing resolution (X',Y') to a resolution (X',Y') that matches the resolution of the input frame 102A. The mask compiler 302 stitches the masked object in the region of the frame with the remaining portion of the frame by pasting the visual representation of the region of the frame (e.g., the masked object at resolution (X,Y)) into the original ROI location of the input frame 102A. In one embodiment, the mask compiler 302 compares a location of the pixels of the region of the frame to the location of pixels of the input frame 102A. Subsequently, the mask compiler 302, replaces the pixels of the input frame 102A with the pixels at corresponding locations in the region of the frame to effectively "add" the masked object in the region of the frame to the entirety of the frame. In some embodiments, the mask compiler 302 sets the pixels values of the remaining portion of the frame (e.g., the pixels of the input frame 102A) to a value. For example, pixels in the frame are set to a value of '0', and pixels associated with the masked object are set to a value of '1'. In this manner, the mask compiler 302 compiles the masked frame 122 including the masked object.

In some embodiments, the masked frame 122 is displayed for a user as an output of the segmentation system 100. In other embodiments, the masked frame 122 is communicated to one or more devices for subsequent processing.

At numeral 2, a reliability manager 304 receives the masked frame 122 and probability of each pixel belonging to the object in the region of the frame 120 to determine whether the masked frame 122 should be stored in the segmentation system 100 as a past mask in past mask memory 124. In some embodiments, the reliability manager 304 receives the masked frame 122 and the rescaled probability of each pixel belonging to the object of the frame (e.g., the rescaled probability determined by the confidence manager 210). In some embodiments, the reliability manager 304 receives the masked region of the frame before the mask compiler 302 stitches the masked region of the frame with the remaining portion of the frame.

In some embodiments, the input frame 102A may be a frame that does not include significant context with respect to the video sequence. For example, the input frame 102A may be a blurry frame (e.g., optical/motion blur), a blank frame (e.g., object occlusion), and the like. The reliability manager 304 ensures that only reliable frames are stored in the limited past mask memory 124 of the memory module 108. Accordingly, the reliability manager 304 determines the reliability of the masked frame 122 (and/or the region of the masked frame including the masked object) such that only frames associated with reliable masked object predictions are stored in past mask memory 124.

It should be appreciated that the probability of a pixel belonging to the selected object (identified in initial masked frame 102B) should follow a bimodal distribution. For example, each pixel should either be associated with the object (e.g., set to a value of "1") or not associated with the object (e.g., set to a value of "0"). Accordingly, the reliability manager 304 determines whether the masked frame 122 is reliable (and/or the region of the masked frame including the masked object is reliable) based on the uncertainty (or certainty) of the probability of each pixel belonging to the object in the region of the frame 120. For example, the probability of each pixel belonging to the object in the region of the frame 120 will be uncertain/unreliable if the frame associated with the uncertain/unreliable masked object prediction is occluded. In operation, the reliability manager determines a reliability score of the masked object prediction according to Equation (2) below:

$$\text{Reliability} = \text{Average}(2 \times |\text{probability of each pixel} - 0.5|) \quad (2)$$

The reliability manager 304 compares the reliability score of the masked object in the region of the frame to a reliability threshold (e.g., 0.85). If the reliability score satisfies the reliability threshold, then the masked frame 122 (or the masked region of the frame before the mask compiler 302 stitches the masked region of the frame with the remaining portion of the frame) is passed to the memory encoder 308 to be stored in the memory module 108. If the reliability score does not satisfy a reliability threshold (or satisfies an unreliability threshold), the masked frame 122 is discarded.

At numeral 3, the memory encoder 308 receives a masked frame responsive to the reliability manager 304 determining that the masked frame is reliable. For ease of description, the memory encoder 308 is described as receiving the masked frame 122, but it should be appreciated that the memory encoder 308 may receive the region of the masked frame including the masked object. The memory encoder 308 encodes the masked frame 122 into a latent space representation of the masked frame 122. As described herein, the latent space representation may be a feature map (otherwise referred to herein as a feature vector) of extracted properties/characteristics of the masked frame 122. The feature representation of the masked frame is stored in the past mask memory 124 of the memory module 108. Because the past mask memory 124 is fixed, one index of the past mask memory 124 is replaced with masked frame 122. Replacing a particular index of past mask memory 124 is described in FIGS. 5-6. In some embodiments, the masked frame 122 is stored in the past mask memory 124 (e.g., the masked frame 122 and not the latent space representation of the masked frame 122). In some embodiments, both the feature representation of the masked frame 122 and the masked frame 122 are stored in the memory module 108.

At numeral 4, the ROI manager 306 receives the masked frame 122. For ease of description, the ROI manager 306 is described as receiving the masked frame 122, but it should be appreciated that the ROI manager 306 may receive the region of the masked frame including the masked object.

The ROI manager 306 identifies a region of interest associated with the masked object of the masked frame 122. As described with reference to FIG. 4, the ROI manager 306 determines an inflated bounding box around the object in the masked frame. The region encompassing the object in the masked frame is stored in memory as stored ROI 114. As described herein, the ROI tracker 104 applies the stored ROI 114 (e.g., the inflated bounding box around the object in the masked frame at time t) to reduce the size of the frame received by the mask propagation model 150. That is, only a ROI of the frame at time t+1, determined using the stored ROI 114 determined at t, is input into the mask propagation model 150.

Figure 4:
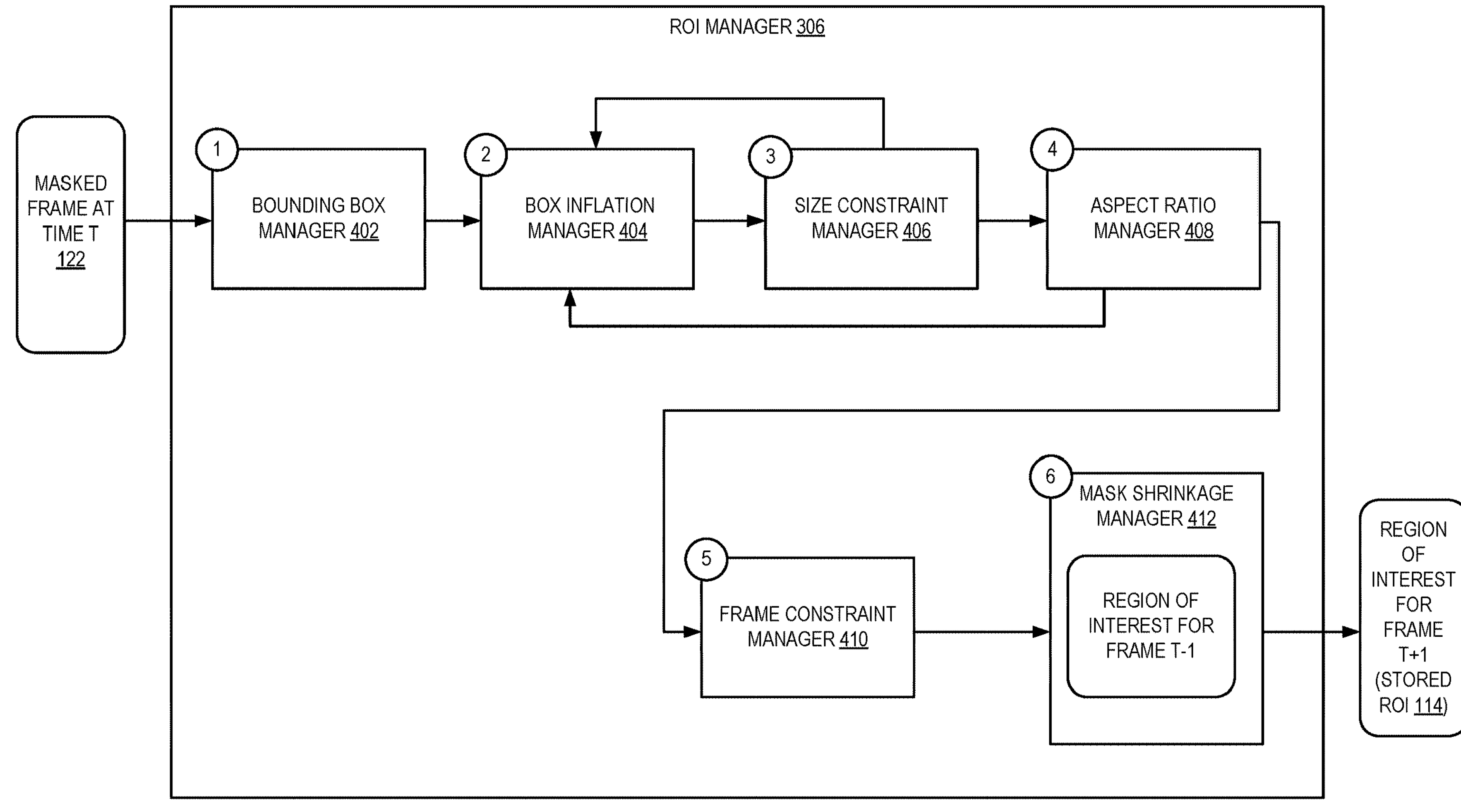
FIG. 4 illustrates a diagram of a process of determining a region of interest of a masked frame, in accordance with one or more embodiments.

FIG. 4 illustrates a diagram of a process of determining a region of interest of a masked frame, in accordance with one or more embodiments. For ease of description, the ROI manager 306 is described as receiving the masked frame 122, but it should be appreciated that the ROI manager 306 may receive the region of the masked frame including the masked object. The ROI manager 306 determines a bounding box around the masked object of the masked frame, where the size of the location and size of the bounding box becomes the stored ROI 114.

At numeral 1, a bounding box manager 402 computes a bounding box around the mask in the received masked frame 122 at time t. The bounding box manager 402 may deploy any one or more object detection algorithms to identify a bounding box in the received frame. In some embodiments, the bounding box manager 402 detects contrasting pixel values. For example, the masked object in the frame may be represented by pixels filled with a value (e.g., pixels of the masked object are set to '1.') In contrast, any pixel not included in the masked object may be represented by pixels filled with a different value (e.g., pixels that are not the masked object are set to '0'.) In some embodiments, the bounding box manager 402 creates a bounding box by identifying the closest contrasting pixels to the masked object and creating a rectangle around the masked object.

At numeral 2, the box inflation manager 404 inflates one or more corners of the bounding box rectangle to increase the total area of the bounding box. The corners of the bounding box are inflated by a predetermined amount (e.g., a number of pixels, a percent of the total area of the bounding box, and the like). The box inflation manager 404 inflates the area of the bounding box to account for the object associated with the bounding box moving at a subsequent frame of the video. In other words, the box inflation manager 404 inflates the area of the bounding box to include temporal context information associated with the bounding box.

At numeral 3, the size constraint manager 406 determines whether the inflated bounding box satisfies a size threshold. The size threshold (e.g., a minimum size threshold or a maximum size threshold) is a predetermined size (e.g., a number of pixels, a total area of the bounding box, and the like). The size constraint manager 406 ensures that the determined region of interest (e.g., the inflated bounding box) is not too small (or too large). If the size constraint manager 406 determines that the inflated bounding box does not satisfy a minimum size threshold, then the box inflation manager 404 re-inflates the area of the bounding box to increase the total area of the bounding box. The size constraint manager 406 and box inflation manager 404 iterate until the size constraint manager 406 determines that the inflated bounding box satisfies the minimum size threshold.

At numeral 4, the aspect ratio manager 408 determines whether the inflated bounding box satisfies a minimum/maximum aspect ratio. For example, the aspect ratio manager 408 determines an aspect ratio of the inflated bounding box by determining the width of the inflated bounding box and the height of the inflated bounding box. The aspect ratio manager 408 compares the calculated aspect ratio of the inflated bounding box to a predetermined minimum or maximum aspect ratio. If the aspect ratio manager 408 determines that the inflated bounding box does not satisfy the minimum/maximum aspect ratio, then the box inflation manager 404 re-inflates the area of the bounding box such that the size of the bounding box satisfies the minimum/maximum aspect ratios. For example, the box inflation manager 404 may inflate a bounding box from a rectangular shape to a square shape if the aspect ratio is 1:1. Because the region of the frame 106 is resized for processing (as described in FIG. 1), the aspect ratio manager 408 determines that the inflated bounding box (used to determine the stored ROI 114) satisfies the minimum and/or maximum aspect ratio. In some embodiments, the size constraint manager 406 re-determines whether the inflated bounding box satisfies the minimum/maximum size constraint. The aspect ratio manager 408 and box inflation manager 404 iterate until the aspect ratio manager 408 determines that the inflated bounding box satisfies the minimum/maximum aspect ratio.

At numeral 5, the frame constraint manager 410 determines whether the inflated bounding box is constrained to the size of the frame. In some embodiments, the inflated bounding box may exist in a region that is unbounded by the size of the frame. If any one or more portions of the inflated bounding box exist outside of the frame, the frame constraint manager 410 constrains those one or more portions of the bounding box to the frame. For example, the frame constraint manager 410 resizes the inflated bounding box to constrain the portions of the bounding box outside of the bounds of the frame.

At numeral 6, the mask shrinkage manager 412 determines whether the size of the inflated bounding box is shrinking by more than a shrinkage constraint (e.g., a number of pixels, a total area of the bounding box, etc.). In operation, the mask shrinkage manager 412 compares the size of the region of interest of the ROI for the previous frame (e.g., the stored ROI 114 for the frame at t−1) to the size of the inflated bounding box (e.g., the ROI associated with the frame at time t). If the difference between the two sizes satisfies a predetermined threshold, then the size of the inflated bounding box is adjusted. For example, the mask shrinkage manager 412 adjusts the inflated bounding box by an average size. The average size may be determined by averaging the size of the ROI associated with the frame at time t (e.g., the inflated bounding box) and the ROI associated with the frame at time t−1. In other embodiments, the size of the ROI associated with the frame at time t is adjusted by a predetermined size. The output of the mask shrinkage manager 412 represents the determined ROI of the masked object in the frame at time t. As described herein, the ROI of the masked object in the frame at time t is used for processing at a time t+1. Accordingly, the output of the ROI manager 306 is the stored ROI 114 for processing at time t+1.

Figure 5:
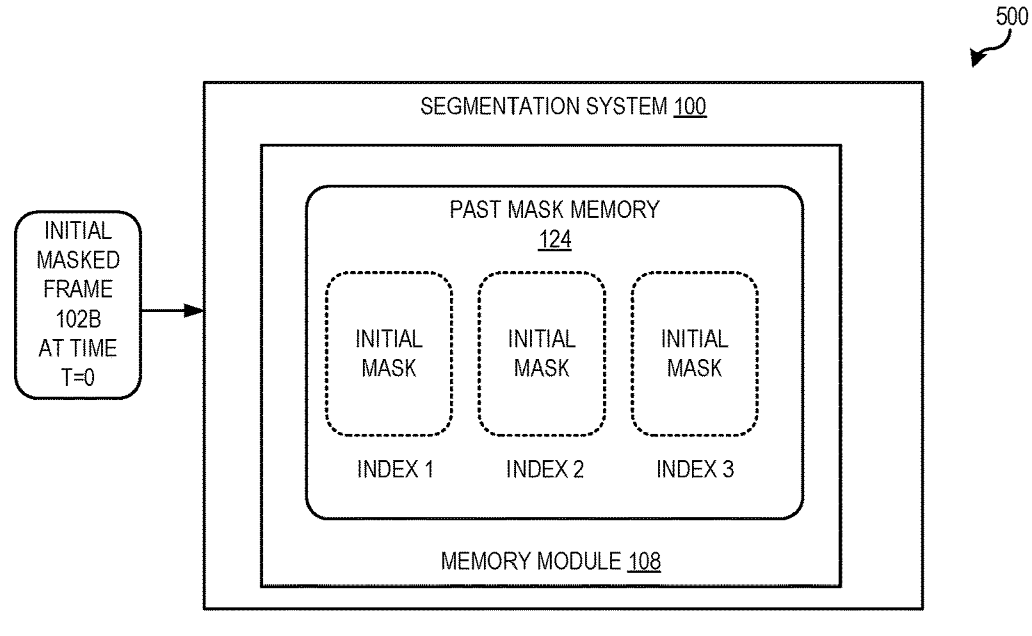
FIGS. 5-6 illustrate storing past masks to the memory module using a pre-allocated past mask memory size, according to some embodiments, according to some embodiments.
Figure 5:
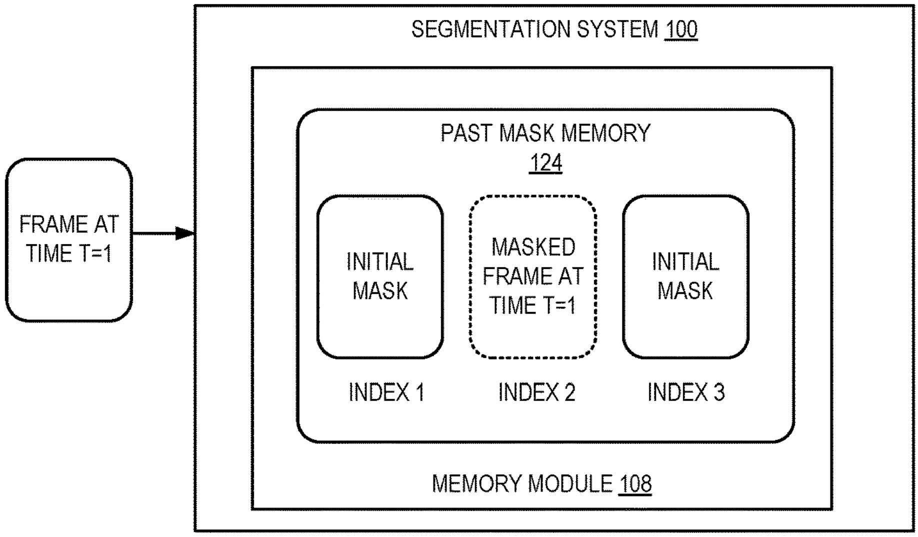
Figure 6:
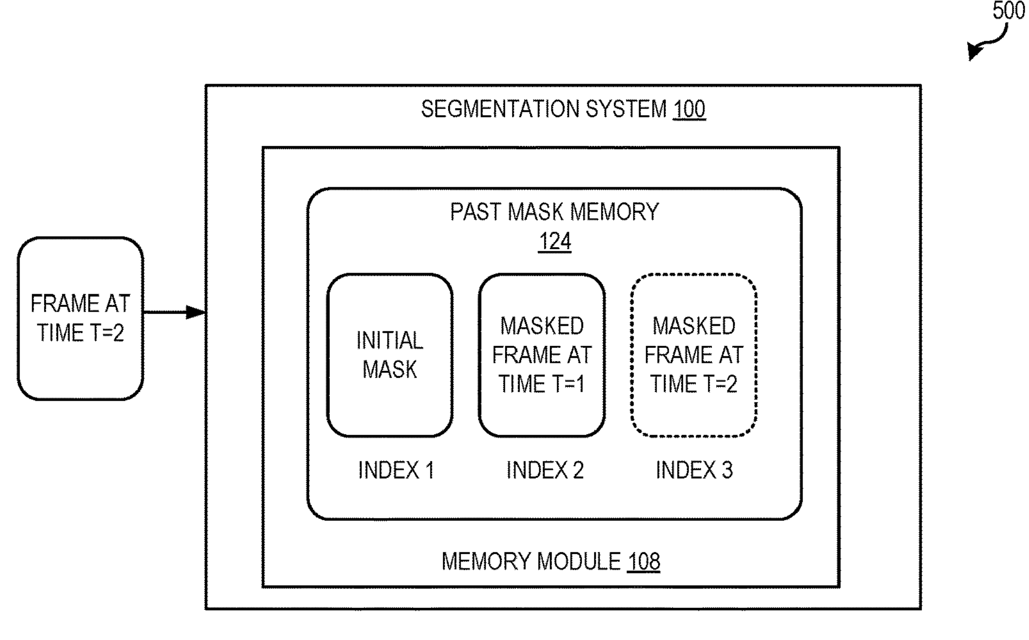

FIGS. 5-6 illustrate storing past masks to the memory module using a pre-allocated past mask memory size, according to some embodiments. Unlike conventional systems whose size of memory storing past masks dynamically increases over time, the number of past masks stored in the past mask memory 124 is pre-allocated to a size k. For ease of description, the size k of the past mask memory 124 is k=3, however k may be any positive integer.

The example 500 of FIGS. 5-6 illustrates states of the past mask memory over time. The dashed lines around indices of past mask memory 124 indicate a storage unit of the pre-allocated memory being updated. Accordingly, each index of past mask memory 124 corresponds to a storage unit of pre-allocated memory. As described herein, the past masks stored in the past mask memory 124 may be representations of past masks (such as a feature map determined by the memory encoder 308 of FIG. 3), past masks (such as masked frame 122), a region of the past mask (such as the region of the frame determined by the mask compiler 302 before the mask compiler 302 stitches the region of the mask to the input frame 102A), and/or a region of a representation of the past mask (such as a feature map of the region of the frame).

In the example 500 of FIG. 5, at time t=0, the segmentation system 100 receives the initial masked frame 102B (e.g., a masked representation of the object to be segmented) as part of input 102. As shown, the memory module 108 stores the initial masked frame 102B in the past mask memory 124. Specifically, index 1 of 3 of the past mask memory 124 stores the initial mask 102B. The memory module 108 then initializes all of the pre-allocated memory of the past mask memory 124 with the initial mask 102B. Specifically, the memory module 108 duplicates the initial mask 102B for each of the other indices of the pre-allocated storage up to index k. For example, for k=3, each index is updated such that index 2 of 3 stores the initial mask, and index 3 of 3 stores the initial mask.

Continuing with the above example, the segmentation system 100 receives a frame at time t=1 of the video. The segmentation system 100 performs the systems and methods described herein to determine masked frame 122 at time t=1 using past masks (e.g., the memory of the initial mask). Responsive to the reliability manager 304 determining that the frame at time t=1 is reliable, the masked frame at time t=1 is stored in past mask memory 124. In some embodiments the memory encoder 308 encodes the masked frame 122 at time t=1 (or the region of the masked frame including the masked object at time t=1) to obtain a feature map of the masked frame at time t=1 (or the region of the masked frame including the masked object at time t=1). Subsequently, the memory module 108 stores the encoded masked frame 122 at time t=1 for use during a subsequent time. As described herein, the initial masked frame is stored at index 1, and the encoded masked frame 122 (e.g., a feature representation of masked frame 122) replaces a stored frame in the past mask memory 124. Specifically, the first index is maintained, and the k−1 index is maintained. Accordingly, in example 500, index 2 of 3 is updated to store the encoded masked frame 122 at time t=1, while index 3 of 3 and index 1 of 3 both store the initial mask.

FIG. 6 continues with the example 500 from FIG. 5. The segmentation system 100 receives a frame at time t=2 of the video. The segmentation system 100 performs the systems and methods described herein to determine masked frame 122 at time t=2 using past masks (e.g., the memory of the initial mask and the memory of the masked frame 122 at time t=1). Responsive to the reliability manager 304 determining that the frame at time t=2 is reliable, the masked frame at time t=2 is stored in past mask memory 124. In some embodiments the memory encoder 308 encodes the masked frame 122 at time t=2 (or the region of the masked frame including the masked object at time t=2) to obtain a feature map of the masked frame at time t=2 (or the region of the masked frame including the masked object at time t=2). Subsequently, the memory module 108 stores the encoded masked frame 122 at time t=2 for use during a subsequent time. As described herein, the initial mask frame is stored at index 1, and the encoded masked frame 122 (e.g., a feature representation of masked frame 122) replaces a stored frame in the past mask memory 124. Accordingly, in example 500, index 2 of 3 stores the encoded masked frame 122 at time t=1, and index 3 of 3 is updated to store the encoded masked frame 122 at time t=2.

Continuing with the above example, the segmentation system 100 receives a frame at time t=3 of the input video. The segmentation system 100 performs the systems and methods described herein to determine masked frame 122 at time t=3 using past masks (e.g., the memory of the initial mask, the memory of the masked frame 122 at time t=1, and the memory of the masked frame at time t=2). Responsive to the reliability manager 304 determining that the frame at time t=3 is reliable, the masked frame at time t=3 is stored in past mask memory 124. In some embodiments the memory encoder 308 encodes the masked frame 122 at time t=3 (or the region of the masked frame including the masked object at time t=3) to obtain a feature map of the masked frame at time t=3 (or the region of the masked frame including the masked object at time t=3). Subsequently, the memory module 108 stores the encoded masked frame 122 at time t=3 for use during a subsequent time. As described herein, the initial mask frame is stored at index 1, and the encoded masked frame 122 (e.g., a feature representation of masked frame 122) replaces a stored frame in the past mask memory 124. Accordingly, in example 500, index 2 of 3 is updated to store the encoded masked frame 122 at time t=3, and index 3 of 3 stores the encoded masked frame 122 at time t=2.

As illustrated and described in FIGS. 5-6, the initial mask is maintained at the first index of the pre-allocated past mask memory 124. As described herein, the initial mask is the masked object based on a user selection of an object to be masked. Accordingly, the initial mask is maintained in the past mask memory 124 as a ground truth. Over time, each of the other masks stored in the past mask memory 124 are predictions of the segmented object across frames of the video. To prevent degraded segmented object predictions over time, the initial mask is maintained in past mask memory 124. Accordingly, the initial mask is to determine the memory key and memory value, as described in FIG. 2. Specifically, the memory key encodes a robust representation of visual information of a region of a previous frame for accurate memory readout, and the memory value encodes detailed information like pixel probabilities along with corresponding visual information for accurate mask decoding. Maintaining a ground in the past mask memory 124 (e.g., a first index corresponding to a first storage unit of past mask memory) prevents (or otherwise minimizes/reduces) degraded object segmentation predictions over time.

Figure 7:
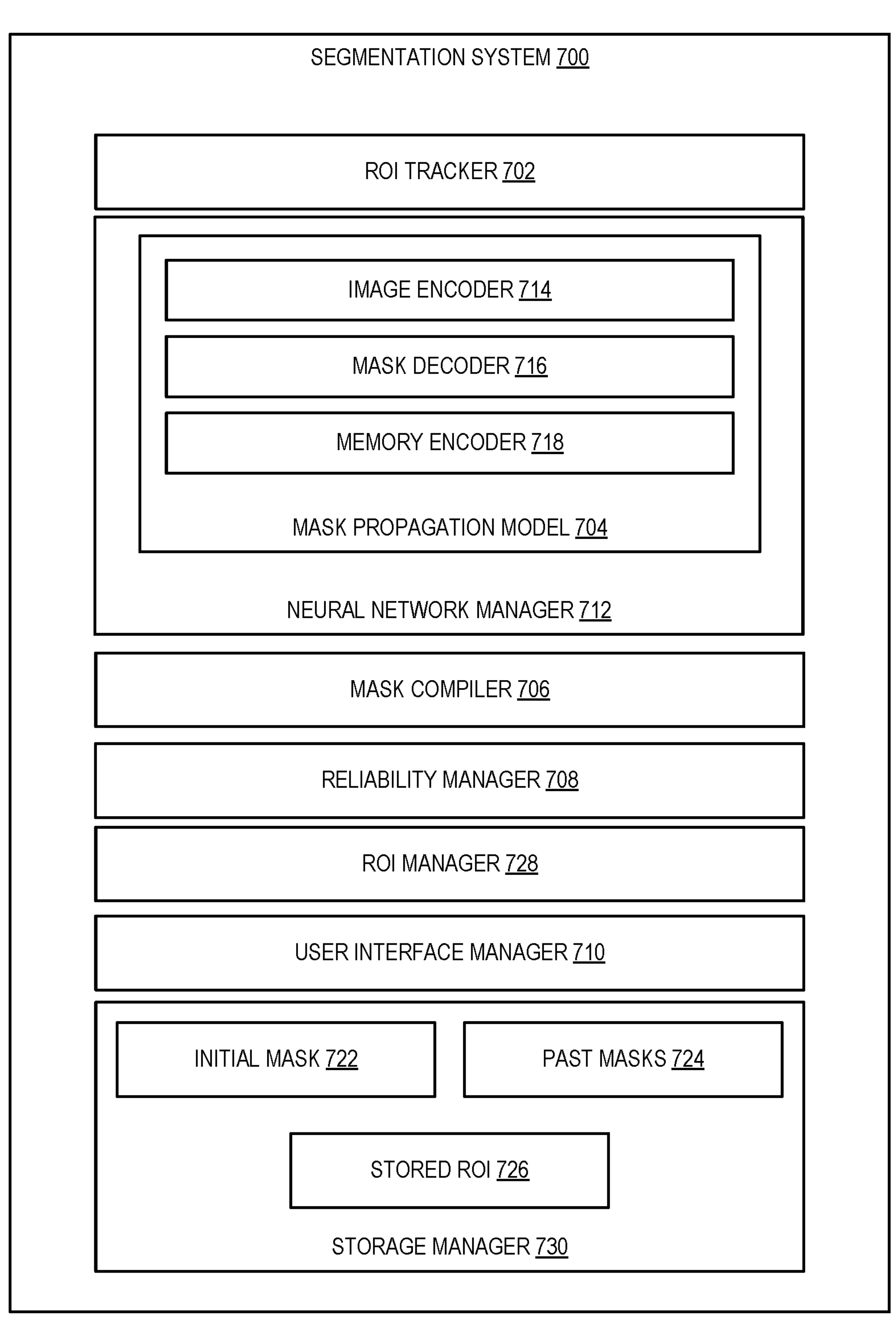
FIG. 7 illustrates a schematic diagram of segmentation system in accordance with one or more embodiments.

FIG. 7 illustrates a schematic diagram of segmentation system (e.g., "segmentation system" described above) in accordance with one or more embodiments. As shown, the segmentation system 700 may include, but is not limited to, an ROI tracker 702, a mask propagation model 704, a mask compiler 706, a reliability manager 708, a ROI manager 728, a user interface manager 710, a neural network manager 712, and storage manager 730. As shown, the mask propagation model 704 includes, but is not limited to, an image encoder 714, a mask decoder 716, and a memory encoder 718.

As illustrated in FIG. 7, the segmentation system 100 includes a ROI tracker 702. The ROI tracker 702 applies a stored ROI 726 to each input frame to shrink the size of the input frame. Accordingly, only a region of the input frame is processed, instead of the entire input frame. The stored ROI 726 identifies a region of the current frame (e.g., a frame of the video at time t) that likely includes the object to be segmented. As described herein, the stored ROI 726 is based on a region of interest associated with a masked object of a previous masked frame (e.g., past mask 724 at time t−1).

As illustrated in FIG. 7, the segmentation system 700 includes a neural network manager 712. The neural network manager 712 may host a plurality of neural networks or other machine learning models, such as the mask propagation model 704 and/or each of the components of the mask propagation model 704 including the image encoder 714, the mask decoder 716, and/or the memory encoder 718. The neural network manager 712 may include an execution environment, libraries, and/or any other data needed to execute the machine learning models. In some embodiments, the neural network manager 712 may be associated with dedicated software and/or hardware resources to execute the machine learning models.

As shown, the neural network manager 712 hosts the mask propagation model 704. As described herein, the mask propagation model 704 may be any memory-based video object segmentation model with an image encoder component, mask decoder component, and memory encoder component. As described herein, the mask propagation model 704 is a modified XMem model. The modified XMem model differs from a conventional XMem model because of the pre-allocated past mask memory storage. As described herein, conventional XMem models leverage dynamic computational graphs, while the mask propagation model 704 described herein leverage a static computational graph.

The mask propagation model 704 includes an image encoder 714. The image encoder 714 transforms a region of the frame into a latent space representation of the region of the frame. The latent space representation is a space in which unobserved features are determined such that relationships and other dependencies of such features can be learned. The latent space representation may be a feature map (otherwise referred to herein as a feature vector) of extracted properties/characteristics of the region of the frame 106. The mask propagation model 704 also includes a mask decoder 716. The mask decoder 716 decompresses or otherwise reconstructs the encoded region of the frame using the latent space representation of the portion of the frame. For example, the mask decoder 716 converts the feature map into a probability of each pixel belonging to the object in the region of the frame. In some embodiments, the mask decoder 716 determines a probability distribution of each pixel belonging to the object. In some embodiments, the mask decoder 716 rescales the determined probability distribution. For example, the mask decoder 716 rescales the probability distribution of each pixel belonging to the object, binarizing the predicted likelihood that one or more pixels are associated with the object.

The mask propagation model 704 also includes a memory encoder 718. The memory encoder 718 converts reliable frames into feature maps to be stored as past masks 724. In some embodiments, the memory encoder 718 converts reliable regions of frames into feature maps to be stored as past masks 724.

Although depicted in FIG. 7 as being hosted by a single neural network manager 712, in various embodiments the neural networks may be hosted in multiple neural network managers and/or as part of different components. For example, each component of the mask propagation model 705 (e.g., the image encoder 714, the mask decoder 716, and the memory encoder 718) can be hosted by their own neural network manager, or other host environment, in which the respective neural networks execute. In other embodiments, groups of machine learning models may be executed by their own neural network manager or other host environment. Additionally, or alternatively, each machine learning model (or groups of machine learning models) may be spread across multiple neural network managers depending on, e.g., the resource requirements, traffic, lag, etc.

As illustrated in FIG. 7, the segmentation system 700 includes a mask compiler 706. The mask compiler 706 converts a numerical representation of the region of the frame (e.g., a probability distribution, a binarized probability distribution, etc.) into a visual representation of the region of the frame. For example, pixels set to a value of "0" correspond to a low probability of a pixel belonging to an object while pixels set to a value of "1" correspond to a high probability of a pixel belonging to an object. The mask compiler 706 overlaps one or more visual indicators over the segmented object of the region of the frame to mask an object in the region of the frame. Such overlayed visual indicators may be colors, patterns, and the like, displayed to the user. The masked frame masks an object of the region of the frame. In some embodiments, the mask compiler 706 stitches the masked object in the region of the frame with the remaining portion of the frame using the current frame. The masked frame retains the pixel data of the current frame except for the replaced region of the frame including the masked object.

As illustrated in FIG. 7, the segmentation system 700 includes a reliability manager 708. The reliability manager 708 determines whether the masked frame should be stored in the segmentation system 700 as a past mask 724. The reliability manager 708 determines the reliability of the masked frame (and/or the region of the masked frame including the masked object) using a reliability score based on the probability of each pixel in the region belonging to the object. Responsive to the reliability score satisfying a reliability threshold, the frame (or the region of the frame) is stored as past masks 724.

As illustrated in FIG. 7, the segmentation system includes a ROI manager 728. The ROI manager 728 identifies a region of interest associated with the masked object of the masked frame. As described with reference to FIG. 4, the ROI manager 728 determines an inflated bounding box around the object in the masked frame. The region encompassing the object in the masked frame is stored in memory as stored ROI 726.

As illustrated in FIG. 7, the segmentation system 700 includes a user interface manager 710. The user interface manager 710 allows a user to provide input videos to the segmentation system 700. The input video is partitioned into frames at instances of time that are processed by the segmentation system 700, as described herein. In some embodiments, the user interface manager 710 provides a user interface through which the user can upload the input video. Alternatively, or additionally, the user interface 710 may enable the user to download an input video from a local or remote storage location (e.g., by providing an address (e.g., a URL or other endpoint) associated with an image source). In some embodiments, the user interface can enable a user to link an image capture device, such as a camera or other hardware to capture video data and provide it to the segmentation system 700. Additionally, the user interface manager 710 allows a user to select an object to be segmented. The selected object to be segmented becomes the masked object in each frame of the video. In some embodiments, the user interface manager 710 enables the user to view the resulting output masked video and/or provide the masked video for downstream processing. In some embodiments, the user interface manager 710 allows users to edit the video as a result of the object segmentation performed on each frame of the video. For example, the user can remove a segmented object, highlight a segmented object, and the like.

As illustrated in FIG. 7, the segmentation system includes a storage manager 730. The storage manager 730 maintains data for the segmentation system 700. The storage manager 730 can maintain data of any type, size, or kind as necessary to perform the functions of the segmentation system 700. The storage manager 730, as shown in FIG. 7, includes the initial mask 722. The initial mask is an initial masked frame associated with the object to be segmented. In other words, the initial masked frame is a frame of the masked object at a first period of time (e.g., time t=0). The initial masked frame is stored in memory as a ground truth during processing of subsequent frames.

The storage manager 730, as shown in FIG. 7, includes the past masks 724. The past masks 724 stored in the storage manager 730 may be a representation of a past mask, a past mask, a representation of a region of a past mask, or a region of a past mask. As described herein, each time the segmentation system 700 process a frame of the input video, a representation of the mask is stored such that the representation of the mask can be used during processing of a next frame of the video.

The storage manager 730 also stores stored ROI 726. As described herein, only a region of the received frame is processed by the mask propagation model 704. The region of the frame processed by the mask propagation model 704 is determined by the region of a previously masked frame. As described herein, a region manager determines a bounding box around a masked object of a previous frame such that the size and location of the bounding box is used to identify a region of interest in a subsequent frame. The region of interest (e.g., the stored ROI) is applied to the subsequent frame to reduce the size of the subsequent frame. The reduced size of the subsequent frame is the region of the frame that likely includes the object to be segmented.

Each of the components of the segmentation system 700 and their corresponding elements (as shown in FIG. 7) may be in communication with one another using any suitable communication technologies. It will be recognized that although components are shown to be separate in FIG. 7, any of components may be combined into fewer components, such as into a single facility or module, divided into more components, or configured into different components as may serve a particular embodiment.

The components of the segmentation system 700 can comprise software, hardware, or both. For example, the components can comprise one or more instructions stored on a computer-readable storage medium and executable by processors of one or more computing devices. When executed by the one or more processors, the computer-executable instructions of the segmentation system 700 can cause a client device and/or a server device to perform the methods described herein. Alternatively, the components of the segmentation system 700 can comprise hardware, such as a special purpose processing device to perform a certain function or group of functions. Additionally, the components of the segmentation system 700 can comprise a combination of computer-executable instructions and hardware.

Furthermore, the components of the segmentation system 700 may, for example, be implemented as one or more stand-alone applications, as one or more modules of an application, as one or more plug-ins, as one or more library functions or functions that may be called by other applications, and/or as a cloud-computing model. Thus, the components of the segmentation system 700 may be implemented as a stand-alone application, such as a desktop or mobile application. Furthermore, the components of the segmentation system 700 may be implemented as one or more web-based applications hosted on a remote server. Alternatively, or additionally, the components of the segmentation system 700 may be implemented in a suite of mobile device applications or "apps." To illustrate, the components of the of the segmentation system 700 may be implemented as part of an application, or suite of applications, including but not limited to ADOBE CREATIVE CLOUD, ADOBE PHOTOSHOP, ADOBE ACROBAT, ADOBE ILLUSTRATOR, ADOBE LIGHTROOM and ADOBE INDESIGN. "ADOBE", "CREATIVE CLOUD," "PHOTOSHOP," "ACROBAT," "ILLUSTRATOR," "LIGHTROOM," and "INDESIGN" are either registered trademarks or trademarks of Adobe Inc. in the United States and/or other countries.

As shown, the segmentation system 700 can be implemented as a single system. In other embodiments, the segmentation system 700 can be implemented in whole, or in part, across multiple systems. For example, one or more functions of the segmentation system 700 can be performed by one or more servers, and one or more functions of the segmentation system 700 can be performed by one or more client devices. The one or more servers and/or one or more client devices may generate, store, receive, and transmit any type of data used by the segmentation system 700, as described herein.

In one implementation, the one or more client devices can include or implement at least a portion of the segmentation system 700. In other implementations, the one or more servers can include or implement at least a portion of the segmentation system 700. For instance, the segmentation system 700 can include an application running on the one or more servers or a portion of the segmentation system 700 can be downloaded from the one or more servers. Additionally or alternatively, the segmentation system 700 can include a web hosting application that allows the client device(s) to interact with content hosted at the one or more server(s).

For example, upon a client device accessing a webpage or other web application hosted at the one or more servers, in one or more embodiments, the one or more servers can provide access to a user interface displayed at a client device. The client device can prompt a user for a video and a selection of an object to be masked in the video. Upon receiving the video and the selected object, the client device can provide the video to the one or more servers, which can automatically perform the methods and processes described herein to segment the object in frames of the video, masking the object in the video. The one or more servers can then provide access to the user interface displayed at the client device with segmented objects of the video.

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 9. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks will be discussed in more detail below with regard to FIG. 9.

The server(s) may include one or more hardware servers (e.g., hosts), each with its own computing resources (e.g., processors, memory, disk space, networking bandwidth, etc.) which may be securely divided between multiple customers (e.g. client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 9.

Figure 8:
FIG. 8 illustrates a flowchart of a series of acts in a method of segmenting an object in a video in accordance with one or more embodiments.

FIGS. 1-7, the corresponding text, and the examples, provide a number of different systems and devices that allows a user to select an object to be segmented and view the masked object in a video. In addition to the foregoing, embodiments can also be described in terms of flowcharts comprising acts and steps in a method for accomplishing a particular result. For example, FIG. 8 illustrates a flowchart of an exemplary method in accordance with one or more embodiments. The method described in relation to FIG. 8 may be performed with fewer or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart 800 of a series of acts in a method of segmenting an object in a video in accordance with one or more embodiments. In one or more embodiments, the method 800 is performed in a digital medium environment that includes the segmentation system 700. The method 800 is intended to be illustrative of one or more methods in accordance with the present disclosure and is not intended to limit potential embodiments. Alternative embodiments can include additional, fewer, or different steps than those articulated in FIG. 8.

As illustrated in FIG. 8, the method 800 includes an act 802 of obtaining a region of interest of a current frame of a video sequence depicting an object. The current frame is an instantaneous image of the video processed by a machine learning model at time t. The current frame includes an object to be segmented. The region of interest of the current frame is the region of the frame that likely includes the object to be segmented, based on the object to be segmented being in the region of interest of a previous frame (e.g., a frame at time t−1). The region of interest is applied to the current frame to shrink the size of the current frame.

As illustrated in FIG. 8, the method 800 includes an act 804 of determining, by a mask propagation model, a likelihood of each pixel of the current frame being associated with the object in the region of interest of the current frame based on the region of interest of the current frame and a fixed number of previous frames of the video sequence including the object. The mask propagation model uses representations of past masks (e.g., a memory value and a memory key, as described with reference to FIG. 2) to temporally associate a region of the frame with the representations of past masks. In other words, the mask propagation model tracks segmented objects of each frame using memory of segmented objects in previous frames.

The mask propagation model determines a probability (e.g., a likelihood) of the object in the region of the frame. Such a probability is used to determine a masked frame. For example, the probability of the object in the region of the frame may be a probability distribution of each pixel in the region belonging to the object. In an example, a pixel that likely belongs to the object receives a high likelihood (e.g., a value of 1), and a pixel that likely does not belong to the object receives a low likelihood (e.g., a value of 0).

As described herein, the memory of previous frames is fixed. For example, only k previously masked frames are stored as past masks in past mask memory. A previously masked frame includes a region of a previously masked frame, a previously masked frame output by the segmentation system, a representation of a previously masked frame output by the segmentation system (e.g., a feature map), and/or a representation of a region of a previously masked frame.

As illustrated in FIG. 8, the method 800 includes an act 806 of replacing a previous frame of the fixed number of previous frames with the current frame. As described herein, the fixed number of previous frames are stored in a pre-allocated size of memory. Because the size of the memory is fixed, the segmentation system determines whether to update the frames stored in the memory. Frames in the memory are replaced by reliable frames later in time (e.g., at a time period t+1 after the previously stored reliable frame). The reliability of the frame is determined using a reliability score based on the probability of each pixel in the region of the current frame belonging to the object. Pixels should either belong to the object (e.g., the likelihood of the pixel is high such as 1) or not belong to the object (e.g., the likelihood of the pixel is low such as 0). Accordingly, pixel probabilities that are uncertain (e.g., a value of 0.5) may be representative of an unreliable frame (e.g., a frame that is blurry, the object in the frame is occluded, etc.). Responsive to the reliability score satisfying a reliability threshold, the frame (or the region of the frame) replaces a different frame to be stored as a past mask of the past masks 724.

As illustrated in FIG. 8, the method 800 includes an act 808 of displaying the current frame of the video sequence including a masked object in the region of interest of the current frame based on the likelihood of one or more pixels of the current frame being associated with the object. The numerical representation of the region of the frame (e.g., a probability distribution, a binarized probability distribution, etc.) is converted into a visual representation of the region of the frame to be displayed to a user. For example, pixels set to a value of "0" correspond to a low probability/likelihood of a pixel belonging to an object while pixels set to a value of "1" correspond to a high probability/likelihood of a pixel belonging to an object. One or more visual indicators are overlapped over the segmented object of the region of the frame to mask an object in the region of the frame. Such overlayed visual indicators may be colors, patterns, and the like, displayed to the user. The masked frame masks an object of the region of the frame.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other non-transitory storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
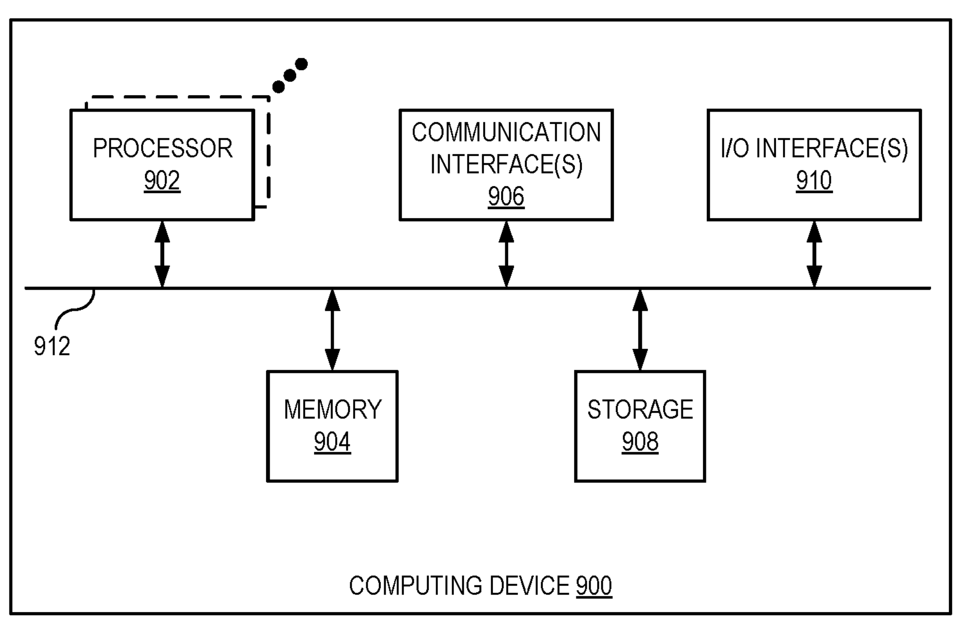
FIG. 9 illustrates a block diagram of an exemplary computing device in accordance with one or more embodiments.

FIG. 9 illustrates, in block diagram form, an exemplary computing device 900 that may be configured to perform one or more of the processes described above. One will appreciate that one or more computing devices such as the computing device 900 may implement the segmentation system. As shown by FIG. 9, the computing device can comprise a processor 902, memory 904, one or more communication interfaces 906, a storage device 908, and one or more I/O devices/interfaces 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 908 and decode and execute them. In various embodiments, the processor(s) 902 may include one or more central processing units (CPUs), graphics processing units (GPUs), field programmable gate arrays (FPGAs), systems on chip (SoC), or other processor(s) or combinations of processors.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The computing device 900 can further include one or more communication interfaces 906. A communication interface 906 can include hardware, software, or both. The communication interface 906 can provide one or more interfaces for communication (such as, for example, packet-based communication) between the computing device and one or more other computing devices 900 or one or more networks. As an example and not by way of limitation, communication interface 906 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can comprise hardware, software, or both that couples components of computing device 900 to each other.

The computing device 900 includes a storage device 908 includes storage for storing data or instructions. As an example, and not by way of limitation, storage device 908 can comprise a non-transitory storage medium described above. The storage device 908 may include a hard disk drive (HDD), flash memory, a Universal Serial Bus (USB) drive or a combination these or other storage devices. The computing device 900 also includes one or more input or output ("I/O") devices/interfaces 910, which are provided to allow a user to provide input to (such as user strokes), receive output from, and otherwise transfer data to and from the computing device 900. These I/O devices/interfaces 910 may include a mouse, keypad or a keyboard, a touch screen, camera, optical scanner, network interface, modem, other known I/O devices or a combination of such I/O devices/interfaces 910. The touch screen may be activated with a stylus or a finger.

The I/O devices/interfaces 910 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 910 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:

determining a fixed number of storage units, wherein each storage unit of the fixed number of storage units stores a previous frame of a video sequence comprising a masked object;

obtaining a region of interest of a current frame of the video sequence depicting an object;

duplicating a ground truth frame masking the object based on the fixed number of storage units;

storing at least one of the ground truth frame or a duplicated ground truth frame in each storage unit;

determining, by a mask propagation model, a likelihood of each pixel of the current frame being associated with the object in the region of interest of the current frame based on the region of interest of the current frame and the masked objects in each of the previous frames stored in the fixed number of storage units;

replacing, in a storage unit of the fixed number of storage units, a previous frame of the video sequence with the current frame comprising a masked object in the region of interest; and displaying the current frame of the video sequence including the masked object in the region of interest of the current frame based on the likelihood of one or more pixels of the current frame being associated with the object.

2. The method of claim 1, further comprising:

determining that the current frame is a reliable frame by comparing a reliability score associated with the current frame to a reliability threshold, wherein the reliability score is based on the likelihood of each pixel of the current frame being associated with the object in the region of interest of the current frame.

3. The method of claim 1, further comprising:

obtaining a region of interest of a second frame of the video sequence depicting the object;

determining, by the mask propagation model, a likelihood of each pixel of the second frame being associated with the object in the region of interest of the second frame based on the region of interest of the second frame including the object and the masked objects in each of the storage units of the fixed number of storage units;

determining that the second frame is not a reliable frame by comparing a reliability score associated with the second frame to a reliability threshold, wherein the reliability score is based on the likelihood of each pixel of the second frame being associated with the object in the region of interest of the second frame; and discarding the second frame.

4. The method of claim 1, wherein duplicating a ground truth frame masking the object based on the fixed number of storage units further comprises:

obtaining the ground truth frame masking the object; and duplicating the ground truth frame a number of times equal to the fixed number of storage units.

5. The method of claim 4, wherein replacing, in the storage unit of the fixed number of storage units, the previous frame of the video sequence comprising the masked object with the current frame further comprising a masked object in the region of interest comprises:

storing the ground truth frame at a first location in a memory; and storing the previous frame at a location in the memory other than the first location in the memory.

6. The method of claim 1, further comprising:

determining the region of interest of the current frame based on a region of interest of a previous frame including the masked object.

7. The method of claim 1, further comprising:

rescaling the likelihood of each pixel of the current frame being associated with the object in the region of interest of the current frame based on the likelihood of each pixel of the current frame being associated with the object in the region of interest of the current frame based on the region of interest of the current frame and the masked objects in each of the storage units of the fixed number of storage units.

8. The method of claim 1, wherein determining, by the mask propagation model, the likelihood of each pixel of the current frame being associated with the object in the region of interest of the current frame based on the region of interest of the current frame and the masked objects in each of the previous frames stored in the fixed number of storage units further comprises:

comparing a similarity of the region of interest of the current frame to the masked objects in each of the previous frames stored in the fixed number of storage units.

9. A system comprising:

a memory component; and a processing device coupled to the memory component, the processing device to perform operations comprising:

determining a fixed number of storage units, wherein each storage unit of the fixed number of storage units stores a previous frame of a video sequence comprising a masked object;

obtaining a region of interest of a current frame of the video sequence depicting an object;

duplicating a ground truth frame masking the object based on the fixed number of storage units;

storing at least one of the ground truth frame or a duplicated ground truth frame in each storage unit;

determining, by a mask propagation model, a likelihood of each pixel of the current frame being associated with the object in the region of interest of the current frame based on the region of interest of the current frame and the masked objects in each of the previous frames stored in the fixed number of storage units;

replacing, in a storage unit of the fixed number of storage units, a previous frame of the video sequence with the current frame comprising a masked object in the region of interest; and displaying the current frame of the video sequence including the masked object in the region of interest of the current frame based on the likelihood of one or more pixels of the current frame being associated with the object.

10. The system of claim 9, wherein the processing device performs further operations comprising:

determining that the current frame is a reliable frame by comparing a reliability score associated with the current frame to a reliability threshold, wherein the reliability score is based on the likelihood of each pixel of the current frame being associated with the object in the region of interest of the current frame.

11. The system of claim 9, wherein the processing device performs further operations comprising:

obtaining a region of interest of a second frame of the video sequence depicting the object;

determining, by the mask propagation model, a likelihood of each pixel of the second frame being associated with the object in the region of interest of the second frame based on the region of interest of the second frame including the object and the masked objects in each of the storage units of the fixed number of storage units;

determining that the second frame is not a reliable frame by comparing a reliability score associated with the second frame to a reliability threshold, wherein the reliability score is based on the likelihood of each pixel of the second frame being associated with the object in the region of interest of the second frame; and discarding the second frame.

12. The system of claim 9, wherein performing the operation of duplicating a ground truth frame masking the object based on the fixed number of storage units causes the processing device further to perform operations comprising:

obtaining the ground truth frame masking the object; and duplicating the ground truth frame a number of times equal to the fixed number of storage units.

13. The system of claim 12, wherein replacing, in the storage unit of the fixed number of storage units, the previous frame of the video sequence comprising the masked object with the current frame further comprising a masked object in the region of interest causes the processing device to perform further operations comprising:

storing the ground truth frame at a first location in a memory; and storing the previous frame at a location in the memory other than the first location in the memory.

14. The system of claim 9, wherein the processing device performs further operations comprising:

determining the region of interest of the current frame based on a region of interest of a previous frame including the masked object.

15. The system of claim 9, wherein the processing device performs further operations comprising:

rescaling the likelihood of each pixel of the current frame being associated with the object in the region of interest of the current frame based on the likelihood of each pixel of the current frame being associated with the object in the region of interest of the current frame based on the region of interest of the current frame and the masked objects in each of the storage units of the fixed number of storage units.

16. The system of claim 9, wherein determining, by the mask propagation model, the likelihood of each pixel of the current frame being associated with the object in the region of interest of the current frame based on the region of interest of the current frame and the masked objects in each of the previous frames stored in the fixed number of storage units further causes the processing device to perform further operations comprising:

comparing a similarity of the region of interest of the current frame to the masked objects in each of the previous frames stored in the fixed number of storage units.

17. A non-transitory computer-readable medium storing executable instructions, which when executed by a processing device, cause the processing device to perform operations comprising:

determining a fixed number of storage units, wherein each storage unit of the fixed number of storage units stores a previous frame of a video sequence comprising a masked object;

duplicating a ground truth frame masking the object based on the fixed number of storage units;

storing at least one of the ground truth frame or a duplicated ground truth frame in each storage unit;

determining, by a mask propagation model, a likelihood of each pixel of a current frame of the video sequence being associated with an object of the current frame based on the current frame and the masked objects in each of the previous frames stored in the fixed number of storage units;

rescaling the likelihood of each pixel of the current frame being associated with the object of the current frame;

replacing, in a storage unit of the fixed number of storage units, a previous frame of the video sequence with the current frame comprising a masked object based on the rescaled likelihood of each pixel of the current frame being associated with the object of the current frame; and displaying the current frame of the video sequence including the masked object in the current frame based on the rescaled likelihood of one or more pixels of the current frame being associated with the object.

18. The non-transitory computer-readable medium of claim 17, storing instructions that further cause the processing device to perform operations comprising:

determining that the current frame is a reliable frame by comparing a reliability score associated with the current frame to a reliability threshold, wherein the reliability score is based on the rescaled likelihood of each pixel of the current frame being associated with the object in the current frame.

19. The non-transitory computer-readable medium of claim 17, storing instructions that further cause the processing device to perform operations comprising:

obtaining a second frame of the video sequence depicting the object;

determining, by the mask propagation model, a likelihood of each pixel of the second frame being associated with the object in the second frame based on the second frame including the object and the masked objects in each of the storage units of the fixed number of storage units;

rescaling the likelihood of each pixel of the second frame being associated with the object of the current frame;

determining that the second frame is not a reliable frame by comparing a reliability score associated with the second frame to a reliability threshold, wherein the reliability score is based on the rescaled likelihood of each pixel of the second frame being associated with the object in the second frame; and discarding the second frame.

20. The non-transitory computer-readable medium of claim 17, wherein determining, by the mask propagation model, the likelihood of each pixel of the current frame of the video sequence being associated with the object of the current frame based on the current frame and the masked objects in each of the previous frames stored in the fixed number of storage units further causes the processing device to perform further operations comprising:

comparing a similarity of a region of interest of the current frame to the masked objects in each of the previous frames stored in the fixed number of storage units.

* * * * *